United States Patent [19]

Morin et al.

[11] 3,853,473

[45] Dec. 10, 1974

[54] REAGENT AND METHOD FOR UREA DETERMINATION

[75] Inventors: Leo G. Morin; Jerome R. Prox, both of Miami, Fla.

[73] Assignee: Medico Electronic, Inc., Indianapolis, Ind.

[22] Filed: Aug. 30, 1972

[21] Appl. No.: 284,887

[52] U.S. Cl. .................. 23/230 B, 252/408, 424/2, 424/7
[51] Int. Cl. ...................... G01n 31/22, G01n 33/16
[58] Field of Search .................. 23/230 B; 424/2, 7; 252/408

[56] References Cited
UNITED STATES PATENTS

| 3,282,649 | 11/1966 | Bittner | 23/230 B |
|---|---|---|---|
| 3,653,836 | 4/1972 | Gruher | 23/230 B |
| 3,715,188 | 2/1973 | Denney | 23/230 B |

OTHER PUBLICATIONS

Watt et al., Anal. Chem. 26, No. 3, Mar. 1954, 452–453.

Primary Examiner—Robert M. Reese
Attorney, Agent, or Firm—Christen & Sabol

[57] ABSTRACT

A colorimetric reagent and method for the determination of blood urea. The method involves the addition of a small amount of serum to a reagent containing p-dimethylaminobenzaldehyde in acidic dimethylformamide and immediately measuring the increase in absorbance at 450 nm. The increase in absorbance is directly proportional to the urea concentration. The response is sensitive, requires no heating, and is linear up to 125 mg percent of urea nitrogen.

18 Claims, No Drawings

REAGENT AND METHOD FOR UREA DETERMINATION

BACKGROUND OF THIS INVENTION

1. Field of this Invention

This invention relates to a novel method and reagent for the determination of urea in body fluids; and more particularly, to a novel method for the determination of urea with p-dimethylaminobenzaldehyde in acidic dimethylformamide.

2. Prior Art

The determination of urea is frequently performed in clinical laboratories, as the determination is used in the diagnosis of liver and kidney diseases.

There are two fundamental colorimetric methods currently employed for the determination of urea, one is direct and the other is indirect. The direct method involves heating the sample with diacetyl monoxime in acid solution for at least 30 minutes at 100°C., intensifying the resultant yellow color with potassium persulfate or other oxidizing agent, and measuring the increase in absorbance at 520 nm. The indirect method involves digesting the urea with the enzyme urease to form ammonia and measuring the resultant ammonia with Nessler's reagent or by the classical Berthelot reaction. The first method suffers from a lack of sensitivity, the need to boil the reagent, a long 30-minute heating, a lack of linearity, and an unstable color. The second method, although sensitive, is subject to false elevations due to preformed ammonia. In addition, it also requires a minimum of 30 minutes to perform. There have been a few reports of the use of p-dimethylaminobenzaldehyde to measure urea (Reijers and Tax, Cl. Ch. Act. 9 (1964) 197; Watt and Chrisp, Anal. Chem. 26:452,1954). However, all previous methods using p-dimethylaminobenzaldehyde have had very low sensitivity, have required deproteinization due to the high alcohol content required to keep the p-dimethylaminobenzaldehyde in solution, and have suffered from poor reproducibility. For these reasons, the use of p-dimethylaminobenzaldehyde for the determination of urea has been generally discarded.

None of the prior art methods or reagents for the determination of urea are entirely satisfactory. It is desirable to have a reagent and method that will measure urea directly, will not require any heating, will yield results in a few minutes, and which will be sensitive, requiring only small samples.

BROAD DESCRIPTION OF THIS INVENTION

It is an object of this invention to provide a method for determining urea directly within a few minutes. It is another object of the invention to provide a method for determining urea without the use of heat above normal ambient temperatures. Yet, another object of this invention is to so enhance the reaction of urea with p-dimethylaminobenzaldehyde that this reaction will be a very sensitive measure of the urea concentration.

Other objects and advantages of this invention will become apparent from the following description.

It has been found that water and other hydrogen bonding solvents are inhibiting to the reaction of p-dimethylaminobenzaldehyde with urea. It is, therefore, mandatory to minimize the water content to that included with the sample and to minimize the size of the sample. Further, the solvent for the reaction must be water miscible, since the sample is aqueous. It has been found that dipolar aprotic solvents, such as dimethylformamide, are optimum for the reaction of p-dimethylaminobenzaldehyde with urea.

This invention involves a reagent for the determination of urea in biological fluids which comprises an acidified solution of p-dimethylaminobenzaldehyde in a dipolar aprotic solvent.

Preferably, this invention is practised by dissolving p-dimethylaminobenzaldehyde in dimethylformamide to give a p-dimethylaminobenzaldehyde level of 0.1 to 10 gram percent and adding 1 to 30 percent of sulfuric acid or its equivalent of another acid.

In the determination of urea, the serum or other biological fluid sample is mixed with the reagent in a ratio of 1/100 to 1/25 and the concentration colorimetrically determined from the absorbance at 400 nm to 500 nm (preferably at 450 nm) or at 580 nm to 740 nm immediately or up to 30 minutes later.

This invention measures urea directly does not require any heating of the admixture of the sample and the reagent, yields results in a few minutes, give a very sensitive or accurate measurement of the urea concentration and only requires small samples.

The biological fluid can be those of man or animal. Examples of such biological fluids are serum, plasma and urine.

DETAILED DESCRIPTION OF THIS INVENTION

An aprotic dipolar solvent is defined in Monograph 105 of the National Bureau of Standards. Aprotic solvents are almost devoid of acidic or basic properties, for example, aprotic solvents do not interact strongly with acidic solutes, such as carboxylic acids, phenols and mineral acids, or with basic solutes such as amines and derivatives of quanidine or pyridine. They are comparatively inert in character. Aprotic solvents are not masking or leveling solvents, such as water. Indifferent solvents or inert solvents are other names for aprotic solvents. In general, aprotic solvents are organic compounds.

There are generally two classes of aprotic solvents, but this invention uses those aprotic solvents which are termed dipolar aprotic solvents (and which generally have a high dielectric constant ($\epsilon$) that ranges from about 21 to about 46.5). The preferred aprotic solvent is dimethylformamide. Examples of other aprotic solvents in this class are acetone, acetonitrile, nitrobenzene, nitromethane, methyl sulfoxide, benzonitrile, nitromethane, dimethylacetamide, sulfolane (tetramethylenesulfone), N-methyl formamide, formamide, N-methyl propionamide, dimethyl sulfoxide, diethylformamide, diethylacetamide, diethylsulfoxide, dipropylformamide, dipropylacetamide, dipropylsulfoxide, dimethylpropiamide, dimethylbutyramide, and mixtures thereof.

Examples of acids which can be used in this invention are sulfuric acid (preferred), hydrochloric acid, acetic acid, formic acid, orthophosphoric acid, oxalic acid, tartaric acid, maleic acid, citric acid, boric acid, lactic acid, sulfurous acid, benzoic acid, hydrocyanic acid, gallic acid, heptanoic acid, and adipic acid.

Any suitable colorimeter or spectrophotometer can be used to measure the absorbance. Examples of useful colorimeters are: Coleman, Model 44; Perkin-Elmer, Model 124; the colorimeter disclosed in U.S.S.N. 224,457, applicants: Raymond W. Kiess and Peter H. Stewart, filed: Feb. 8, 1972, assignee: Kiess Instruments, Inc., 8768 S. W. 131st Street, Miami, Florida, 33156; and the direct reading colorimeter disclosed in U.S. Pat. No. 3,561,878, inventor: R. W. Kiess.

The following examples are included to further illustrate the invention, but they do not limit the invention.

EXAMPLE 1

To a 1000 ml volumetric flask is added 50 g of p-dimethylaminobenzaldehyde, and the flask is brought to volume with dimethylformamide. To a 100 ml volumetric flask is added 20 ml of concentrated hydrochloric acid (37 percent HC1) and the flask is brought to volume with dimethylformamide. To a series of tubes is added 2.5 ml of the p-dimethylaminobenzaldehyde solution and 0.1 ml of the acidified dimethylformamide; and to each tube is added 0.1 ml of one of the various standard solutions. An intense stable amber color develops in each tube in 3 minutes. Each tube is placed in a colorimeter (Coleman Model 44) and the absorbance determined at 450 nm. It is found that there is a linear proportion between absorbance and the concentration of urea.

EXAMPLE 2

The reagent is prepared as in Example 1. Again, a series of tubes is made to contain 2.6 ml of the reagent of p-dimethylaminobenzaldehyde in acidified dimethylformamide. Pooled human serum is made to contain 10, 30, 50, 70 and 100 mg percent urea nitrogen. To each of the above tubes of the reagent is added 0.1 ml of human serum containing one of the stated levels of urea. An intense stable amber color develops in each tube in 3 minutes. Each tube is placed in a colorimeter (Coleman Model 44) and the absorbance is in linear proportion to the concentration of urea as in Example 1.

EXAMPLE 3

The reagent is prepared as in Example 1, except that 20 ml of concentrated sulfuric acid is used instead of hydrochloric acid. Standards are prepared as in Example 1. The procedure is the same as in Example 1. An intense stable amber color develops immediately. The absorbance at 450 nm is in linear proportion to the urea concentration.

EXAMPLE 4

The reagent is prepared as in Example 3. Pooled human serum is prepared as in Example 2. The procedure is the same as in Example 1. An intense stable amber color develops immediately. The absorbance at 450 nm is in linear proportion to the urea concentration.

What is claimed is:

1. A reagent for the determination of urea in biological fluids comprised of an acidified solution of p-dimethylaminobenzaldehyde in a dipolar aprotic solvent, said p-dimethylaminobenzaldehyde being present at a level between 0.1 to 10 gram percent, and the solution being acidified by an acidifying agent which is present in an amount between 1 to 30 percent.

2. A reagent according to claim 1 wherein said dipolar solvent is dimethylformamide.

3. A reagent according to claim 1 wherein said solution is acidified with an acid.

4. A reagent according to claim 3 wherein the acid is sulfuric acid.

5. A reagent according to claim 4 wherein said dipolar aprotic solvent is dimethylformamide.

6. A method for determining urea in biological fluids which comprises mixing a small sample of biological fluid with the reagent of claim 1, the ratio of the biological fluid to the reagent being between 1:100 and 1:25, and determining the concentration of the urea by means of measuring the absorbance.

7. A method according to claim 6 wherein the absorbance is measured at a point between 400 and 500 nm.

8. A method according to claim 6 wherein a colorimeter is used to measure the absorbance.

9. A method according to claim 6 wherein the determination of urea from the absorbance is made within 30 minutes after the mixing of the sample and the reagent.

10. A method according to claim 6 wherein said dipolar aprotic solvent is dimethylformamide.

11. A method according to claim 6 wherein said solution is acidified with an acid.

12. A method according to claim 11 wherein the acid is sulfuric acid.

13. A reagent for the determination of urea in biological fluids consisting of an acidified solution of p-dimethylaminobenzaldehyde in a dipolar aprotic solvent, said p-dimethylaminobenzaldehyde being present at a level between 0.1 to 10 gram percent, and the solution being acidified by an acidifying agent which is present in an amount between 1 to 30 percent.

14. A reagent according to claim 13 wherein said dipolar aprotic solvent is dimethylformamide.

15. A reagent according to claim 13 wherein said solution is acidified with an acid.

16. A reagent according to claim 15 wherein the acid is sulfuric acid.

17. A reagent according to claim 16 wherein said dipolar aprotic solvent is dimethylformamide.

18. A method for determining urea in biological fluids which comprises mixing a small sample of biological fluid to the reagent of claim 13 being between 1:100 and 1:25, and determining the concentration of the urea by means of measuring the absorbance.

* * * * *